PREPARATION OF SEMICONDUCTIVE MATERIALS FOR TRANSLATING DEVICES

Filed Dec. 29, 1948 3 Sheets-Sheet 1

INVENTORS: J. H. SCAFF
H. C. THEUERER
BY [signature]
ATTORNEY

INVENTORS: J.H. SCAFF
H.C. THEUERER
BY [signature]
ATTORNEY

INVENTORS: J. H. SCAFF
H. C. THEUERER
BY [signature]
ATTORNEY

Patented July 8, 1952 2,602,763

UNITED STATES PATENT OFFICE 2,602,763

PREPARATION OF SEMICONDUCTIVE MATERIALS FOR TRANSLATING DEVICES

Jack H. Scaff, Summit, N. J., and Henry C. Theuerer, New York, N. Y., assignors to Bell Telephone Laboratories, Incorporated, New York, N. Y., a corporation of New York Application December 29, 1948, Serial No. 67,894

7 Claims. (Cl. 148—13)

This invention relates to the preparation of semiconductive material for use in translating devices such as rectifiers and the like. In its more specific aspects the invention is concerned with the preparation of germanium material in a manner to render it particularly suitable for devices of the types indicated.

As has been pointed out in applicants' application Serial No. 638,351 filed December 29, 1945, germanium containing significant impurities in relatively minute amounts may be prepared for use in devices such as point contact rectifiers, by suitable heat treatment.

It is an object of this invention to improve the characteristics, particularly the electrical characteristics of germanium type translators such as rectifiers and the like.

A further object of this invention is the production of germanium material for translators in a manner to control the resistivity and the conductivity type (either N or P type) of such material.

A feature of this invention comprises heat treating semiconductive material having both excess and deficit conductivity determining factors, such as donor and acceptor impurities, at particular temperatures and then cooling the material to normal temperature, to produce a desired conductivity type and prescribed resistivity. The temperature for germanium material, is from 400 to 500° C. for producing minimum resistivity N type material; from 500° C. up to some intermediate temperature below 900° C. at which conversion from N to P type material occurs, for producing N-type material of increasingly higher resistivity; and from the conversion temperature to 900° C. for producing P-type material of increasingly lower resistivity with a minimum resistivity at about 900° C.

A further features of this invention resides in heat treating an N or P-type material at a temperature necessary to convert it to the opposite conductivity type and arresting the treatment short of the time necessary for complete conversion to obtain a higher resistivity material than is obtainable by a complete conversion at that temperature.

The foregoing and other objects and features of this invention will be understood more clearly and fully from the following detailed description of exemplary embodiments thereof with reference to the accompanying drawings in which.

Figure 5:
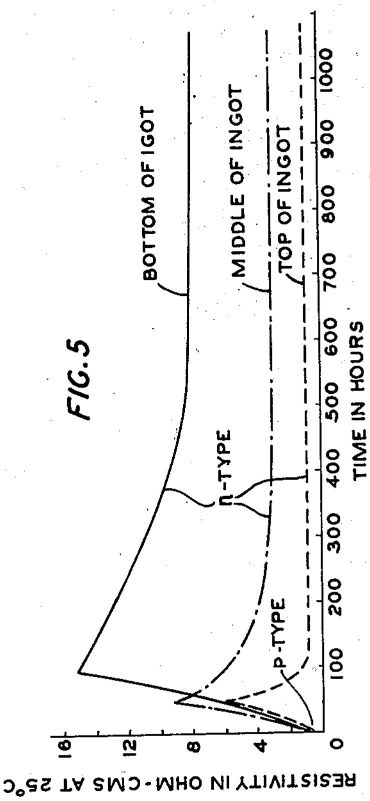
Figure 4:
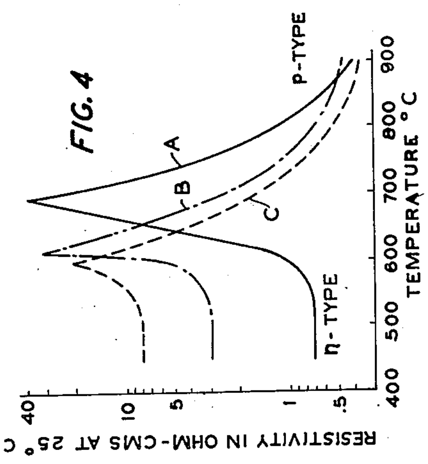
Figures 2, 6, 7:
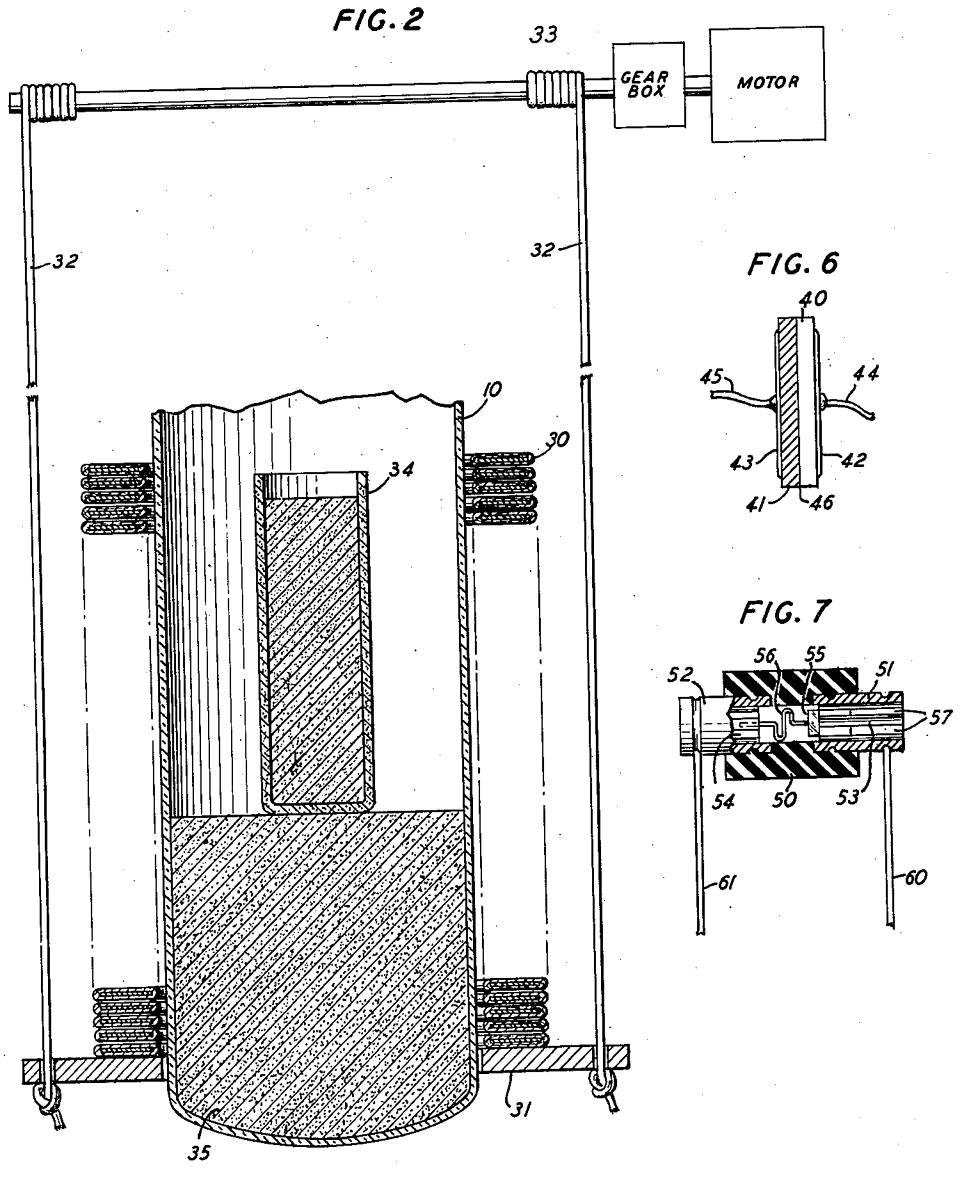
Fig. 2 is a sectional view of a portion of a furnace and of auxiliary means employed in another stage of the process.
Figure 3:
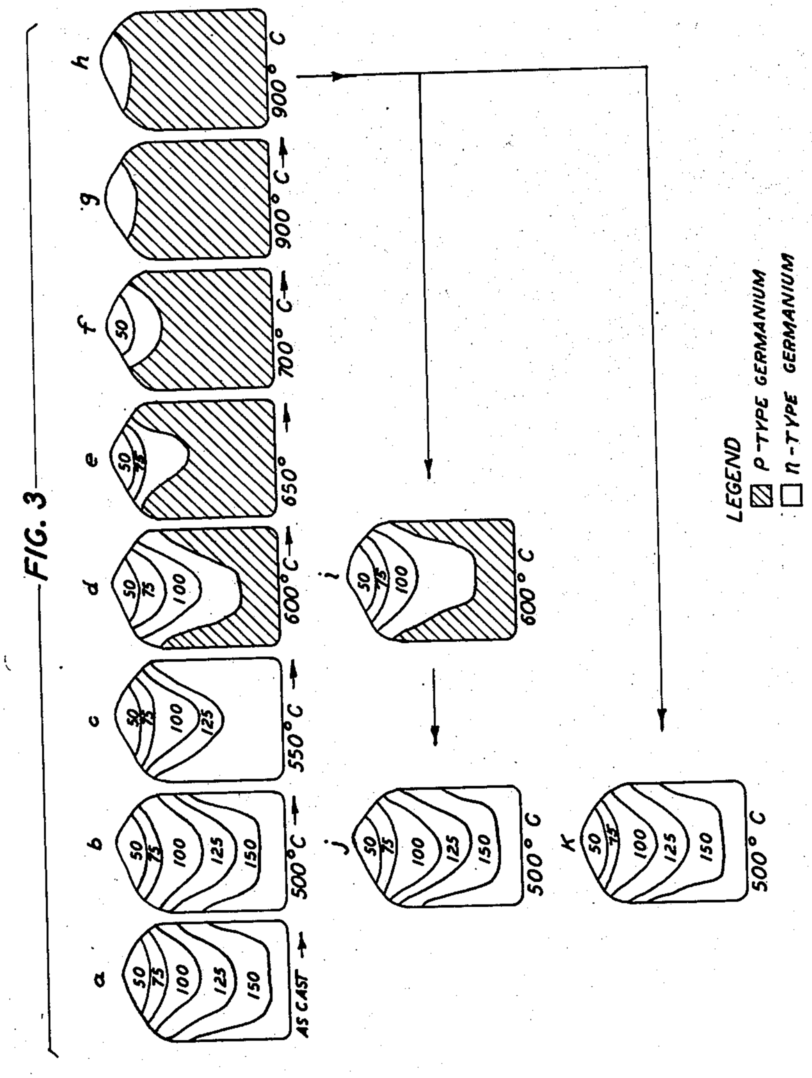

Figs. 3a to 3k inclusive, are conventionalized sections in accordance with the accompanying legend, of ingots of germanium materials that have been given different heat treatments;

Fig. 4 shows graphically the changes in resistivity which occur as the result of various heat treatments in germanium materials from the top, middle and bottom sections respectively of an ingot;

Fig. 5 shows graphically the changes in resistivity which occur in germanium materials from the top, middle and bottom sections of an ingot with the time of treatment at a temperature of 400° C.;

Fig. 6 illustrates one form of an area contact, a symmetric conductor made of two types of germanium material, the type being indicated in accordance with the legend of Fig. 3; and Fig. 7 illustrates one form of point contact rectifier illustrative of one embodiment of this invention.

Figure 1:
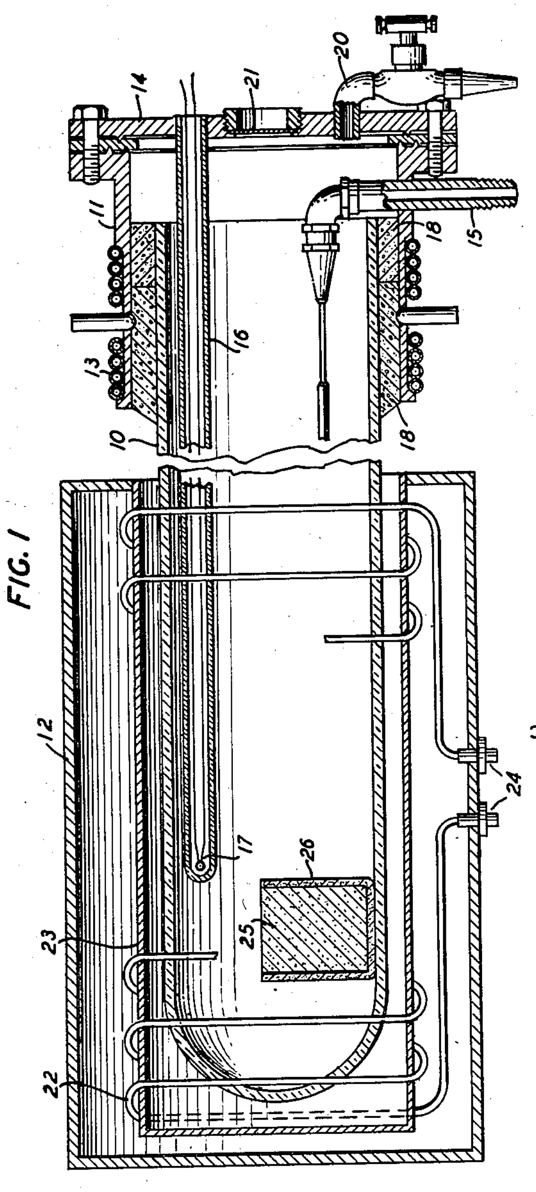
Fig. 1 is a sectional view of a furnace suitable for use in one stage of the process in accordance with one feature of the invention.

The units or crystals employed in the making of asymmetric conductors in one embodiment of this invention are from suitable portions of ingots of germanium material. Germanium material may be prepared from germanium oxide by hydrogen reduction in a furnace such as the one illustrated in Fig. 1. The furnace, which is used in a horizontal position, comprises a tube 10 of silica or like material, provided with a water cooled head 11 and a heater 12. The head 11 is provided with cooling coils 13, a cover 14 and a gas inlet 15 and is joined vacuum tight to tube 10 by packing 18. A shield tube 16 of silica or other suitable material, secured to the head 14, contains a thermocouple 17 for measuring temperature. The head 14 is provided also with a gas outlet 20 and a viewing window 21.

The heater 12 may comprise a coil of resistance wire 22 wound on a suitable form 23 and having terminals 24.

The material 25 to be processed, in this case germanium dioxide, is contained in a dish or boat 26, which may be made of graphite or other suitable material which will not react unfavorably with the material being processed.

An illustrative reduction of germanium oxide may be carried out as follows: About 75 grams of the oxide 25 are placed in a graphite boat 26 which is put into the tube 10, which is then sealed by cover 14. After the furnace tube is flushed with pure dry hydrogen, the oxide is heated to 650° C. and held at this temperature for about three hours while a flow of hydrogen of about 10 liters per minute is maintained. During the next hour the temperature is raised to about 1000° C. to complete the reduction with the germanium in the liquid state. The charge is then rapidly cooled to room temperature. Reduction by this process results in a body of germanium of about 51 grams weight, which may subsequently be broken into lumps or pieces of convenient size for further processing.

The next treatment may be carried out in an induction furnace, portions of which are illustrated in Fig. 2. This furnace is similar to the one illustrated in Fig. 1 but is employed in the vertical position and is provided with a movable induction heater.

As shown in Fig. 2 the furnace tube 10, the lower portion only of which is shown, is surrounded by the coil 30 of an induction heater. The coil 30 is provided with suitable means for raising or lowering it with respect to the furnace charge. For example, this may be a hoist comprising a platform 31, cable 32 and hoisting mechanism 33.

In preparing the ingot, germanium such as obtained in the reduction process just described is placed in a graphite crucible 34. The charged crucible is placed in the heating zone of the furnace tube on a bed of refractory material 35 such as silica sand. After locating the crucible in the furnace, the furnace tube is closed and flushed with helium. With a helium flow of 1 liter per minute, the charge is first liquefied and then solidified from the bottom upward by raising the external induction coil at the rate of about one-eighth inch per minute keeping the power input through the coil at a constant value. After the ingot has reached 650° C. the power is shut off and the ingot is allowed to cool to room temperature.

Preparatory to using the ingot for making circuit elements it may be given a normalizing treatment at 500° C. for twenty-four hours in a helium or other suitable inert atmosphere to assure that the material is all of N-type with the lowest possible resistivity.

Under some conditions and for some purposes it may be desirable to perform all of the heating in the same furnace. This could be done in a furnace such as shown in Fig. 2. Reduction of the oxide would be done without moving the heater coil. Then the melt could either be allowed to cool and be reheated or cooled progressively by gradual removal of the heater. Subsequently, the normalizing heat treatment could be accomplished in the same furnace by lowering the coil to locate the ingot centrally within said coil and adjusting the power input to maintain the temperature at 500° C.

Ingots made in accordance with the foregoing procedure are N-type germanium having high peak back voltage properties at the bottom and gradually lower peak back voltage properties higher in the ingot. These electrical properties may be determined by an electrical probe test on a suitably prepared surface of a longitudinal section of the ingot. The diagram at *a* in Fig. 3 shows the locations on such an ingot of sections which have the peak reverse voltage properties indicated thereon in volts. From these contour lines it is possible to estimate the peak reverse voltage of material at any location in the ingot. Associated with the gradient in peak back voltage from top to bottom in these ingots is the resistivity gradient such that the lowest resistivity material is at the top of the ingot and the highest resistivity material is at the bottom of the ingot. The gradient in peak back voltage and in resistivity is the result of impurity segregation which occurs in a uniform manner in consequence of the method of solidifying the ingot. Thus the material at the bottom which freezes first has the highest purity and in consequence the highest peak back voltage and resistivity. Higher in the ingot the impurity content increases, and the peak reverse voltage and resistivity are lower, being lowest for the material at the top of the ingot which freezes last.

If an ingot section of N-type material such as is shown at *a* in Fig. 3 is heat treated in an inert atmosphere such as helium or in a vacuum at successively higher temperatures between about 550 and 900° C. for 24 hours, the material in the ingot progressively converts to P-type material as shown in Fig. 3 from *d* to *h* inclusive in accordance with the attached legend. Ingots treated at temperatures above about 550° C. to obtain P-type material are cooled to room temperature with sufficient rapidity to avoid reconversion to N-type material at temperatures below about 550° C. As may be seen from an inspection of the diagrams, the purest material adjacent the bottom of the ingot is changed from N- to P-type at the lowest temperature and the less pure materials higher in the ingot are changed in type at higher temperatures. The material at the extreme top of this particular ingot cannot be converted to P-type even at a temperature of 900° C. Associated with the changes from N- to P-type are the changes in resistivity which are shown in Fig. 4 which gives the resistivity data for various heat treatments for material in the top, middle and bottom sections of the ingot as indicated by curves A, B and C respectively. It will be seen that the resistivity of the N-type material increases with the temperature of heat treatment, becoming a maximum approximately at the minimum temperature at which P-type material is formed. The P-type materials formed at higher temperatures decrease in resistivity with increasing temperature of heat treatment. The conversion from N- to P-type material and the associated changes in resistivity are completely reversible. As an illustration of this, note that if an ingot such as shown at Fig. 3*h* which has been converted to P-type material by a 900° C. treatment is heated at 600° C., it will attain the same characteristics as if it had been heated to 600° C. from the condition shown in Fig. 3*a*. This is shown in Fig. 3 by the correspondence of electrical characteristics in *i* as compared with *d*. Similarly, if after the 600° C. treatment illustrated at *i* the ingot is given a 500° C. treatment, the electrical characteristics will be as shown at Fig. 3*j* which characteristics are like those shown in Fig. 3*b*. Furthermore, if the 500° C. treatment is given to a P-type ingot such as shown at Fig. 3*h*, the same situation will prevail, as illustrated at Fig. 3*k* which is like Figs. 3*b* and 3*j*.

It has been found that in the range between 500 and 900° C., the semiconductive material comes to an equilibrium condition after about twenty-four hours treatment. It should be understood, however, that the changes in properties occurring with a particular heat treatment are substantially completed in much shorter time. Thus an ingot of N-type material such as at Fig. 3a treated for a relatively short time at 650° C. would have characteristics more like those of Fig. 3e than 3a. In other words, much of the change from one type material to the other and a change in resistivity can occur in a very short time. Moreover, since this change does not continue to proceed at normal room temperature or at operating temperatures at which germanium circuit elements are used, the characteristics obtained by a relatively short heat treatment are useful. For example, a body or ingot of germanium material that is of P-type because of a treatment at 900° C. may be reheated at a temperature between 400 and 500° C. for a relatively short time to produce a resistivity that is considerably higher than it would be if the conversion were carried to completion. Germanium material of P-type with a higher resistivity than that ordinarily obtained at a given treating temperature may be provided by treating N-type material at a temperature above the P–N conversion temperature and arresting the treatment short of complete conversion.

At temperatures much below 500° C., conversions from P to N type occur at a very slow rate. For example, a P-type specimen obtained by heat treatment at 900° C. for twenty-four hours, when reheated at 400° C. may take as much as 1000 hours to reach an equilibrium resistivity condition. Such a change of resistivity with time at a low temperature heat treatment is illustrated in Fig. 5 for materials taken respectively from the top, middle and bottom of an ingot and treated at 400° C. in an inert atmosphere.

In order that the ensuing discussion of possible theories involved in this invention may be more fully understood, definitions and explanations of the terms and expressions used are in order.

The conductivity of interest in semiconductors of the type herein under discussion, is due to what may be called a "conductivity determining factor" which controls both the conductivity type and the resistivity of the semiconductive material.

The term "conductivity type" refers to excess or deficit semiconductors in which the conduction is due respectively to an excess or a deficit of electrons. In the excess case, a few electrons are free to move in the atomic lattice and thus conduct current as negative carriers. In the deficit case, there are "holes" in the atomic lattice which allow electron movement and thus conduction. In the latter case, since the "holes" act like positive "electrons" it is more convenient to consider them as the carriers rather than the electrons. Thus, conduction in an excess semiconductor is called conduction by electrons and in a deficit semiconductor, conduction by "holes." The magnitude of conductivity or its reciprocal the resistivity is a function of the number of carriers available for conduction.

The "conductivity determining factor" of semiconductors of the types indicated may be thought of as a change in the atomic lattice whereby carriers are made available for the conduction of current. This change may be brought about in one way by the presence in the semiconductor of significant impurities which either provide electrons for excess semiconduction, or "holes" (by abstraction of electrons) for deficit semiconduction. A significant impurity which causes excess semiconduction is called a donor or donator impurity and one that causes deficit semiconduction an acceptor impurity.

The expression "significant impurities" is here used to denote those impurities which affect the electrical characteristics of the material such as its resistivity, photosensitivity, rectification and the like as distinguished from other impurities which have no apparent effect on these characteristics. The term "impurity" is intended to include intentionally added constituents as well as any which may be included in the basic material as found in nature or as commercially available. In the case of semiconductors which are chemical compounds such as cuprous oxide or silicon carbide, deviations from stoichiometric composition may constitute significant impurities. A change in the atomic lattice by removal of an electron from each of some of the atoms, that is, a lattice defect, may also determine the conductivity type and resistivity. Thus, the "conductivity determining factor" may comprise significant impurities or other lattice disturbing conditions or situations.

The terms N and P type have been applied to semi-conductive materials which tend to pass current easily when the material is respectively negative or positive with respect to a conductive connection thereto and with difficulty when the reverse is true, and which also have consistent Hall and thermoelectric effects. The terms N and P type have also been applied to excess and deficit semiconductors respectively.

The term "barrier" or "electrical barrier" used in the description and discussion of devices in accordance with this invention, is applied to a high resistance boundary condition between adjacent semiconductors of opposite conductivity type, or between a semiconductor and a metallic conductor whereby current passes with relative ease in one direction and with relative difficulty in the other.

This invention may be understood more fully if some of the possible reasons for the behavior of the germanium material under heat treatment are discussed. As indicated this material may be either N type (excess semiconduction) or P type (deficit semiconduction). A theory of upsetting the electronic balance of the atomic structure by the addition or subtraction of electrons will be discussed in terms of an electronic unbalance due to the presence of significant impurities. Some of the donor impurities for N-type germanium occur in the fifth group of the periodic system according to Mendeleeff and include arsenic, antimony and phosphorous. The concentration of these impurities may be of the order of a few parts in ten millions in the germanium material under discussion. Acceptor impurities for P-type germanium may be found in the third group of the periodic system and include aluminum, gallium and indium. The acceptor impurity concentrations are of the same order of magnitude as those of the donor impurities. The semiconductive materials contain both donor and acceptor impurities. One type of impurity tends to compensate or neutralize the other and the conductivity type of the material will be N or P type depending on whether the donor or acceptor impurity is in effective excess.

If neither significant impurity is in effective excess, a neutral condition or conductivity type (neither N nor P type) may be said to exist and the material is of extremely high resistivity. Such a condition may be found at the boundary between adjacent zones of N and P type material and constitutes the previously defined "barrier." Since this barrier region is also photosensitive, its existence may be determined by means of a light beam and suitable detecting equipment.

With the above information as background, it is possible to account for the heat treating effects observed in germanium materials in terms of a changing balance of acceptor and donor impurities. Before further discussion it may be well to observe that the germanium materials under consideration in many respects behave similarly to precipitation hardening alloys. Such alloys contain a constituent whose solid solubility increases with increasing temperature. If such an alloy of a given composition is heated above the solubility temperature, the solid solution may be retained in a metastable state at room temperature by cooling rapidly. Upon reheating to a temperature below the solubility temperature, the unstable solution decomposes precipitating a new phase from the solution with resultant changes of physical and electrical properties. In the present instance the formation of P-type germanium by rapid cooling from temperatures above about 550° C. may result from the partial retention of an acceptor impurity in solid solution, the amount retained increasing with the heat treating temperature. The acceptor impurity thus retained in solid solution may be regarded as active in which form it compensates an equivalent amount of donor impurity, whereas if the acceptor is precipitated from solid solution it may be regarded as inactive, in which form it does not affect the electrical properties of the ingot. If after heat treatment the active acceptor impurity is in excess of the donor, the material is P-type, while if the donor is in excess the material is N-type.

The resistivity changes occurring in germanium as a result of heat treatment are also entirely consistent with the concept of the activation of acceptor impurities by their retention in solid solution. In general, the resistivity of a semiconductor increases as the concentration of active impurity decreases. In germanium material in which there are compensating P and N impurities, the concentration of the impurity which is in excess determines the resistivity. In N-type germanium obtained after a low temperature heat treatment (500° C.) the acceptor impurity is deactivated and the uncompensated donor impurity controls the resistivity. If the germanium material is heat treated at higher temperatures, increasing amounts of acceptor impurity are activated, and increasing amounts of donor impurity are compensated. In consequence, the resistivity rises with increasing temperature of treatment, becoming a maximum at the temperature required to compensate completely the donor impurity. At temperatures above that required for such compensation, the concentration of the acceptor impurity is in excess of the donor and is largest for the highest temperature of treatment. In consequence, the P-type material has diminishing resistivity for the higher temperature treatments.

The reversibility of the P–N conversion and of the associated resistivity changes is also consistent with the limited solid solubility concept since the amount of active acceptor retained in the solution will be expected to be independent of the past history of the specimen and to depend entirely on the temperature of treatment, provided sufficient time is allowed for equilibrium.

The discussion so far has dealt with an explanation for the heat treating effects observed in germanium specimens of uniform composition. In ingots of germanium, the conditions are more complex due to the normal impurity segregation which occurs during the progressive solidification of the ingots. Germanium ingots, as described herein, are prepared by slowly freezing the material from the bottom upward, which results in impurity segregation such that the concentration is least at the bottom and is progressively higher toward the top. If a sufficient part of the acceptor impurities in the ingot are deactivated by a 500° C. treatment, the donor is in excess and the material is N-type. Since the donor concentration is least at the bottom and highest at the top, it follows that the resistivity must be higher at the bottom than at the top of the ingot. In ingots completely converted to P-type germanium, as for example by heating at 900° C. and cooling rapidly, the resistivity is sensibly constant from the top to bottom in the ingot although a small gradient does exist with least resistivity at the top and highest resistivity at the bottom. This suggests that the concentration of the active acceptor impurity held in solid solution is independent of the location in the ingot and is determined by the temperature of heat treatment. This also is consistent with the limited solid solubility principle. The slight gradient observed may be due to the compensating effect of the donor impurity which has higher concentration at the top than at the bottom of the ingot. The effect is small because the concentration of active acceptor impurity is high compared to that of the compensating donor. If on the other hand, the ingot is heat treated at an intermediate temperature say 650° C., the acceptor concentration may be in excess of the donor near the bottom of the ingot but the donor may be in excess higher in the ingot as a consequence of the donor concentration gradient. In such case, the lower portion of the ingot where the acceptor is in excess is P-type and the upper portion where the donor is in excess is N-type. The region separating the P and N material is sharply defined and occurs where the donor and acceptor impurities are completely compensated. At such locations in the ingot the resistivity is maximum since there are no impurity carriers available for electrical conductivity. Above the compensated region, the donor concentration increases, below this region the acceptor concentration increases and in consequence the resisitivity in both the P and N regions diminishes with distance from the P–N boundary region. The location in the ingot at which the P–N boundary occurs is found higher in the ingot with increasing temperature of heat treatment. This result is to be expected since after higher temperature treatments more active acceptor is held in solid solution and will therefore compensate material with larger donor concentrations located higher in the ingot as already noted.

An alternative explanation of the heat treating effect in germanium involves the statement that hole conductivity may be induced in germanium by lattice imperfections. Furthermore, the number of such lattice imperfections may be increased at higher temperature treatments and may be retained at room temperature by rapid cooling. The reasoning here is analogous to the limited solid solubility theory already discussed. In a sense there is no distinction between these theories since the presence of foreign impurities may be regarded as a type of lattice defect. It may be that a combination of lattice defects and acceptor impurities are actually operating.

A theory involving the explanation of the heat treatment phenomena on the basis of deactivated donor impurities may also be postulated. In this case one postulates that donors are deactivated by appropriate thermal treatment. The reasoning is analagous to the first case except that now the 900° C. treatment deactivates the donors and rapid cooling retains their inactive form, while subsequent heating at about 500° C. results in conversion to the active form. To explain complete conversion to N-type germanium by the 500° C. treatment, it is now necessary to postulate that the active donor concentration is everywhere in excess of the acceptor. Since in some cases the 900° C. treatment results in only partial conversion to P-type germanium, it is necessary to suppose that at high concentration the donors are incompletely deactivated.

Although a number of theories to explain heat treatment effects in germanium may be postulated to explain the experimentally observed facts, it is difficult to verify completely one or the other. The concept of thermally deactivated acceptors is preferred, however, because it is compatible with the solid solution concept commonly observed in alloy systems. In general it has been observed that impurities which form solid solutions with semiconductors reduce their resistivity and tend to produce strongly rectifying materials. Since P-type rectification is observed in ingots rapidly cooled from 900° C., it seems reasonable that the acceptors which are held in solid solution by this process are activated. The conversion to N-type germanium by heating at 500° C. may then be due to the deactivation of the acceptors by precipitation of this unstable solid solution.

After processing, the ingot of germanium may be cut into small bodies or crystals for use in rectifiers, other translating devices, resistor elements and the like. For certain purposes it is desirable to control the resistivity as well as the rectification direction or conductivity type of the material used. This can be accomplished by selecting the region of the ingot from which the crystals are cut and giving the material an appropriate heat treatment as determined from curves such as A, B and C of Fig. 4. In this way the resisitivity and rectification direction may be controlled within narrow limits for materials at any location in the ingot.

Another method of controlling the resistivity is to heat the specimen to 900° C. to convert the material to P-type germanium and then to heat the specimen at a lower temperature between 400 and 600° C. as required to convert the material to N-type but to arrest the conversion short of the equilibrium condition. Thus by holding the temperature of treatment constant and varying the heat treating time one may control the resistivity of the material from various parts of the ingot within narrow limits. For example if specimens taken near the top and the middle of an ingot are converted to P-type germanium by a 900° C. treatment and then heated at 400° C. for 55 and 175 hours respectively, a resistivity of 4 ohm-centimeters will be obtained for each as shown in Fig. 5. Also if a slab is cut from an ingot such as shown in Fig. 3, and the slab is given an appropriate heat treatment, part of the slab may be converted to P-type leaving the balance N-type with a barrier separating the two conductivity types. Such slabs with regions of P and N germanium may be obtained from material at any location in the ingot except the extreme top, by appropriate heat treatment. Slabs containing such regions of P and N germanium may be used to prepare an area contact or volume type rectifier such as disclosed in Fig. 6.

In the device shown in Fig. 6, the slab is made up of a portion 40 of high back voltage N-type germanium and a portion 41 of P-type material separated by a barrier 46. Electrodes 42 and 43 are secured respectively to the two sides of the device and leads 44 and 45 secured as by soldering, for example, to the respective electrodes. Besides being a rectifier the device illustrated in Fig. 6 also exhibits photoelectric properties when irradiated at the boundary 46 between the two types of germanium at 40 and 41.

One form of point contact rectifier employing a crystal or unit made in accordance with this invention is illustrated in Fig. 7 in which a main housing 50 of a ceramic or like insulating material is provided with metallic end pieces or members 51 and 52 which are molded into the opposite ends of the housing 50. The rectifier elements are carried on the respective ends of pins 53 and 54 fitted into bores in the end pieces 51 and 52. A crystal element 55 which may be metal coated on one side, for example with copper, is secured to the end of the pin 53 which may be of brass and an S-shaped contact spring 56 is secured to the end of pin 54 which also may be of brass. The spring contact 56 may be of tungsten suitably pointed at the end which makes contact with the crystal 55. The parts are adjusted by suitable positioning of the pins 53 and 54 which make a push fit in the end pieces 51 and 52 respectively. The adjustments are carried on along with electrical stabilizing until the device exhibits the characteristics desired for a particular purpose. After the adjustments are completed, the units are vacuum impregnated with a suitable mixture such as a wax through grooves or flutings 57 provided in the pins 53 and 54. Connections may be made to the end pieces 51 and 52 by any suitable means such as the leads 60 and 61.

Crystal elements such as 55 of the device shown in Fig. 7 may be given an appropriate heat treatment to obtain the desired polarity of rectification and to control the resistivity of the material. Before assembly the crystal may be lapped on one surface with a fine abrasive. This surface may then be etched in a suitable etchant which may comprise ten cubic centimeters of nitric acid, five cubic centimeters of hydrofluoric acid and two-hundred milligrams of copper nitrate in ten cubic centimeters of water. An etching in such a solution for about thirty seconds gives a suitable surface. When the device is assembled the treated surface is outermost and point contact is made thereto.

The active surface of the crystal element may also be subjected to an electrolytic etching to improve the device for some purposes by suitably reducing the back current. This etching may be done after the nitric-hydrofluoric acid etching previously noted or may be done directly on the lapped crystal without the intermediate etching. The crystal may be etched at a positive potential of from four to six volts direct current for from thirty to one hundred and twenty seconds in twenty-four per cent hydrofluoric acid.

Although specific embodiments of the invention have been shown and described, it will be understood that they are but illustrative and that various modifications may be made therein without departing from the scope and spirit of this invention.

What is claimed is:

1. The method of producing germanium material for signal translating devices which comprises heating a germanium alloy containing conductivity determining factors, at a series of temperatures over the range between about 400° C. and 900° C. and measuring the resistivity of said alloy following heating at each of said temperatures, thereby to determine the balance temperature for which the alloy has the highest resistivity, and then further heating said alloy at a selected temperature in said range and cooling to normal temperature, to make the alloy of prescribed conductivity type and resistivity, said selected temperature being about 500° C. for minimum resistivity N-type material, between about 500° C. and said balance temperature for N-type material of increasingly higher resistivity and between said balance temperature and about 900° C. for P-type material of increasingly lower resistivity, to a minimum at about 900° C.

2. The method of producing germanium material for signal translating devices which comprises heating an alloy of germanium and traces of donor and acceptor impurities in an inert atmosphere and at a series of temperatures in the range from about 400° C. and 900° C. and measuring the resistivity of said alloy following heating at each of said temperatures, thereby to determine the balance temperature for which said alloy has the highest resistivity, then further heating said alloy at a selected temperature in said range and cooling to room temperature, thereby to fix the conductivity type and resistivity of said alloy, said selected temperature being about 500° C. for minimum resistivity N-type material, about 900° C. for minimum resistivity P-type material, between about 500° C. and said balance temperature for N-type material of progressively higher resistivity and between said balance temperature and about 900° C. for progressively lower resistivity P-type material.

3. The method of producing high resistivity germanium material for signal translating devices which comprises heating a germanium alloy containing conductivity determining factors at a series of temperatures over the range between about 550° C. and 700° C. and measuring the resistivity of said alloy following heating at each of said temperatures, thereby to determine the balance temperature for which the resistivity of said alloy is the maximum, then further heating said alloy at a temperature slightly to either side of said balance temperature, and cooling to normal temperature.

4. The method of producing high resistivity N-type germanium material, which comprises heating an alloy of germanium and traces of donor and acceptor impurities at a series of temperatures over the range between about 550° C. and 700° C. and measuring the resistivity of said alloy following heating at each of said temperatures, thereby to determine the balance temperature for which the resistivity of said alloy is a maximum, then heating said alloy at a temperature slightly below said balance temperature, and cooling to normal temperature.

5. The method of producing high resistivity P-type germanium material, which comprises heating an alloy of germanium and traces of donor and acceptor impurities at a series of temperatures over the range between about 550° C. and 700° C. and measuring the resistivity of said alloy following heating at each of said temperatures, thereby to determine the balance temperature for which the resistivity of said alloy is a maximum, then heating said alloy at a temperature slightly above said balance temperature, and cooling to normal temperature.

6. The method of producing low resistivity germanium material for signal translating devices which comprises heating a germanium alloy containing conductivity determining factors at a series of temperatures over the range between about 550° C. and 700° C. and measuring the resistivity of said alloy following heating at each of said temperatures, thereby to determine the balance temperature for which the resistivity of said alloy is the maximum, then further heating said alloy at a temperature remote from said balance temperature and between about 400° C. and 900° C., and cooling to normal temperature.

7. The method of producing germanium material of preassigned conductivity type and resistivity which comprises heating a germanium alloy containing conductivity determining factors and of a given conductivity type at a selected temperature to the side of the balance temperature requisite to effect a conversion in the conductivity type of said alloy, arresting the heating short of complete conversion, and cooling to normal, said balance temperature being between about 550° C and 700° C., and said selected temperature being between said balance temperature and 900° C. for conversion from N-type to P-type and between about 400° C. and said balance temperature for conversion from P-type to N-type.

JACK H. SCAFF.
HENRY C. THEUERER.

REFERENCES CITED

The following references are of record in the file of this patent:

Crystal Rectifiers, 1st edition, Radiation Laboratory Series, vol. 15, pages 366 to 369. Edited by Torrey and Whitmer, published in 1948 by the McGraw-Hill Book Co., New York, N. Y.

Transactions of the Electrochemical Society, vol. 89, 1946, pages 280 and 281.

Further Developments in the Preparation and Heat Treatment of Germanium Alloys. Report by Purdue University, Oct. 31, 1945. Classified as P. B. Report 25,734 in Library of Congress.